(12) United States Patent
McGee et al.

(10) Patent No.: US 7,100,362 B2
(45) Date of Patent: Sep. 5, 2006

(54) VEHICLE AND METHOD FOR OPERATING A VEHICLE TO REDUCE EXHAUST EMISSIONS

(75) Inventors: Ryan McGee, Ann Arbor, MI (US); Paul Niessen, Plymouth, MI (US); Fazal Syed, Canton, MI (US); Chris Kapolnek, Dearborn, MI (US); Jonathan Butcher, Dearborn, MI (US); Paul Gartner, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 10/710,750

(22) Filed: Jul. 30, 2004

(65) Prior Publication Data

US 2006/0021329 A1 Feb. 2, 2006

(51) Int. Cl.
F01N 3/00 (2006.01)
(52) U.S. Cl. ............... 60/284; 60/274; 60/285; 180/65.3; 180/65.4; 290/40 C; 290/16
(58) Field of Classification Search ............ 60/274, 60/284, 285, 286; 180/65.2, 65.3, 65.4, 65.6; 290/40 C, 40 R, 16
See application file for complete search history.

(56) References Cited

U.S. PATENT DOCUMENTS

| | | | |
|---|---|---|---|
| 5,345,761 A | 9/1994 | King et al. | |
| 5,588,498 A * | 12/1996 | Kitada ................. | 180/65.4 |
| 5,847,520 A | 12/1998 | Theurillat et al. | |
| 6,032,753 A * | 3/2000 | Yamazaki et al. ....... | 180/65.3 |
| 6,057,605 A * | 5/2000 | Bourne et al. .......... | 290/40 C |
| 6,327,852 B1 | 12/2001 | Hirose | |
| 6,394,209 B1 * | 5/2002 | Goehring et al. ........ | 180/65.4 |
| 6,449,537 B1 | 9/2002 | Phillips et al. | |
| 6,450,274 B1 * | 9/2002 | Konno et al. ........... | 180/65.3 |
| 6,452,286 B1 | 9/2002 | Kubo et al. | |
| 6,480,767 B1 | 11/2002 | Yamaguchi et al. | |
| 6,581,373 B1 * | 6/2003 | Suzuki et al. .......... | 60/285 |
| 6,621,244 B1 | 9/2003 | Kiyomiya et al. | |
| 2001/0024104 A1 | 9/2001 | Suzuki | |
| 2002/0096886 A1 | 7/2002 | Schmitz et al. | |
| 2003/0000751 A1 | 1/2003 | Dentron et al. | |
| 2003/0052650 A1 | 3/2003 | Gunji | |
| 2003/0088343 A1 | 5/2003 | Ochiai et al. | |
| 2003/0089538 A1 | 5/2003 | Boggs et al. | |

FOREIGN PATENT DOCUMENTS

| | | |
|---|---|---|
| JP | 09-154204 | 6/1997 |
| JP | 2002285883 | 10/2002 |
| JP | 2003120263 | 4/2003 |
| JP | 2004278465 | 10/2004 |
| WO | WO 00/23295 | 4/2000 |
| WO | WO 2004/108468 A1 | 12/2004 |

* cited by examiner

Primary Examiner—Binh Q. Tran
(74) Attorney, Agent, or Firm—Brooks Kushman P.C.; Carlos Hanze

(57) ABSTRACT

A method for operating a vehicle to reduce exhaust emissions is provided. The vehicle includes an engine, a motor, a battery for operating the motor, and a catalyst for reducing exhaust gas emissions. The vehicle is operated in a first mode when at least one predetermined condition is met. The first mode includes providing at least some of the desired vehicle output power with the motor. The engine is operated to quickly increase the temperature of the catalyst when the output power from the battery is within a first predetermined range. When the output power of the battery is outside the first predetermined range, the operation of the engine is adjusted to drive battery operation into the first predetermined range. When the at least one predetermined condition is not met, the vehicle is operated in a second mode based at least partly on driver demand and battery requirements.

21 Claims, 3 Drawing Sheets

VEHICLE AND METHOD FOR OPERATING A VEHICLE TO REDUCE EXHAUST EMISSIONS

BACKGROUND OF INVENTION

1. Field of the Invention

The present invention relates to a vehicle and a method for operating a vehicle to reduce exhaust emissions.

2. Background Art

Vehicles have long employed the use of catalysts to reduce engine exhaust emissions. Generally, a catalyst facilitates a reaction between oxygen and unburned hydrocarbons, carbon monoxide, and various nitrogen/oxygen compounds, thereby producing carbon dioxide, nitrogen and water. One limitation of the use of catalysts is that they tend to be ineffective below a certain activation temperature. Thus, below the activation temperature, unburned hydrocarbons, carbon monoxide and nitrogen/oxygen compounds can be exhausted from the vehicle and introduced into the atmosphere.

In order to address this problem, a number of systems have been developed to reduce vehicle emissions prior to a catalyst reaching its activation temperature. One such system is described in U.S. Pat. No. 6,327,852 issued to Hirose on Dec. 11, 2001. Hirose describes the use of a catalyst in conjunction with an adsorbent as part of an exhaust gas emission control apparatus. The catalyst is used to reduce emissions after it has reached its activation temperature. Before the catalyst has reached its activation temperature, the adsorbent is used to adsorb unburned fuel to prevent its release into the atmosphere. One limitation of the apparatus described in Hirose, is that it relies on a separate device— i.e., the adsorbent—to augment the catalyst as part of an emission control system.

Another method of controlling exhaust emissions is to provide a mechanism for quickly heating the catalyst to reduce the amount of time it takes the catalyst to reach its activation temperature. One way to quickly heat the catalyst is to retard the spark timing of the engine. This causes the catalyst to be heated more quickly, but results in a loss of engine power. Thus, if a driver demands an increase in engine power, the spark retard must be reduced, which causes the catalyst to be heated more slowly, and results in more exhaust emissions being introduced into the atmosphere.

The development of hybrid electric vehicles (HEV's) has provided a way to reduce overall engine exhaust emissions, by reducing the amount of time an engine is running. One factor that limits the reduction of exhaust emissions in an HEV is that the engine will typically be stopped and started many more times than in a conventional vehicle. Thus, there is the potential for a great deal of exhaust emissions to be released into the atmosphere during the many times an engine in an HEV is started and operated prior to the catalyst reaching its activation temperature.

Therefore, a need exists for a vehicle and method for operating a vehicle to reduce the amount of exhaust emissions released into the atmosphere following engine start-up.

SUMMARY OF INVENTION

One advantage of the present invention is that it provides a vehicle and a method for operating a vehicle that reduces the release of exhaust emissions into the atmosphere following engine start-up.

Another advantage of the invention is that it reduces emissions while still providing driver demanded power.

The invention also provides a method for operating a vehicle to reduce exhaust emissions. The vehicle includes an engine, an electric machine, an energy storage device capable of providing energy to operate the electric machine, and a catalyst for facilitating a reaction in exhaust gas from the engine. The method includes setting at least one engine parameter to effect an increase in a rate of temperature increase of the catalyst when the engine is operating. This decreases the time required for the catalyst to reach a temperature whereat emissions are reduced. The engine is operated such that the engine output power is generally constant when an output power of the energy storage device is within a first predetermined range. The at least one engine parameter is adjusted, thereby changing the engine output power, when the output power of the energy storage device is outside the first predetermined range. The at least one engine parameter is adjusted to facilitate a change in the output power of the energy storage device from outside the first predetermined range into the first predetermined range.

The invention further provides a method for operating a vehicle to reduce exhaust emissions. The vehicle includes an engine, an electric machine, an energy storage device capable of providing energy to operate the electric machine, and a catalyst for facilitating a reaction in exhaust gas from the engine. The method includes determining a desired output power for the vehicle. The vehicle is operated in a first mode when at least one predetermined condition is met. The first mode includes providing at least some of the desired vehicle output power with the electric machine when the desired vehicle output power is non-zero. At least one engine parameter is set to effect an increase in a rate of temperature increase of the catalyst when the engine is operating. The engine is operated such that engine output power is generally constant when an output power of the energy storage device is within a first predetermined range. The first mode also includes adjusting the at least one engine parameter, thereby changing the engine output power, when the output power of the energy storage device is outside the first predetermined range. The at least one engine parameter is adjusted to facilitate a change in the output power of the energy storage device from outside the first predetermined range into the first predetermined range. The method also includes operating the vehicle in a second mode when the at least one predetermined condition is not met. The second mode includes operating the engine at least partly based on the desired vehicle output power and a state of the energy storage device.

The invention also provides a vehicle that includes an engine, an electric machine operable to drive the vehicle, and an energy storage device capable of providing energy to operate the electric machine. The vehicle also includes a catalyst capable of facilitating a reaction in exhaust gas from the engine, and at least one controller. The at least one controller is configured to set at least one engine parameter to effect an increase in a rate of temperature increase of the catalyst when the engine is operating. This decreases the time required for the catalyst to reach a temperature whereat emissions are reduced. The at least one controller is further configured to control the engine to provide a generally constant output power when an output power of the energy storage device is within a first predetermined range. The controller is further configured to adjust the at least one engine parameter, thereby changing the engine output power, when the output power of the energy storage device is outside the first predetermined range. The at least one engine parameter is adjusted to facilitate a change in the output power of the energy storage device from outside the first predetermined range into the first predetermined range.

DETAILED DESCRIPTION

Figure 1:
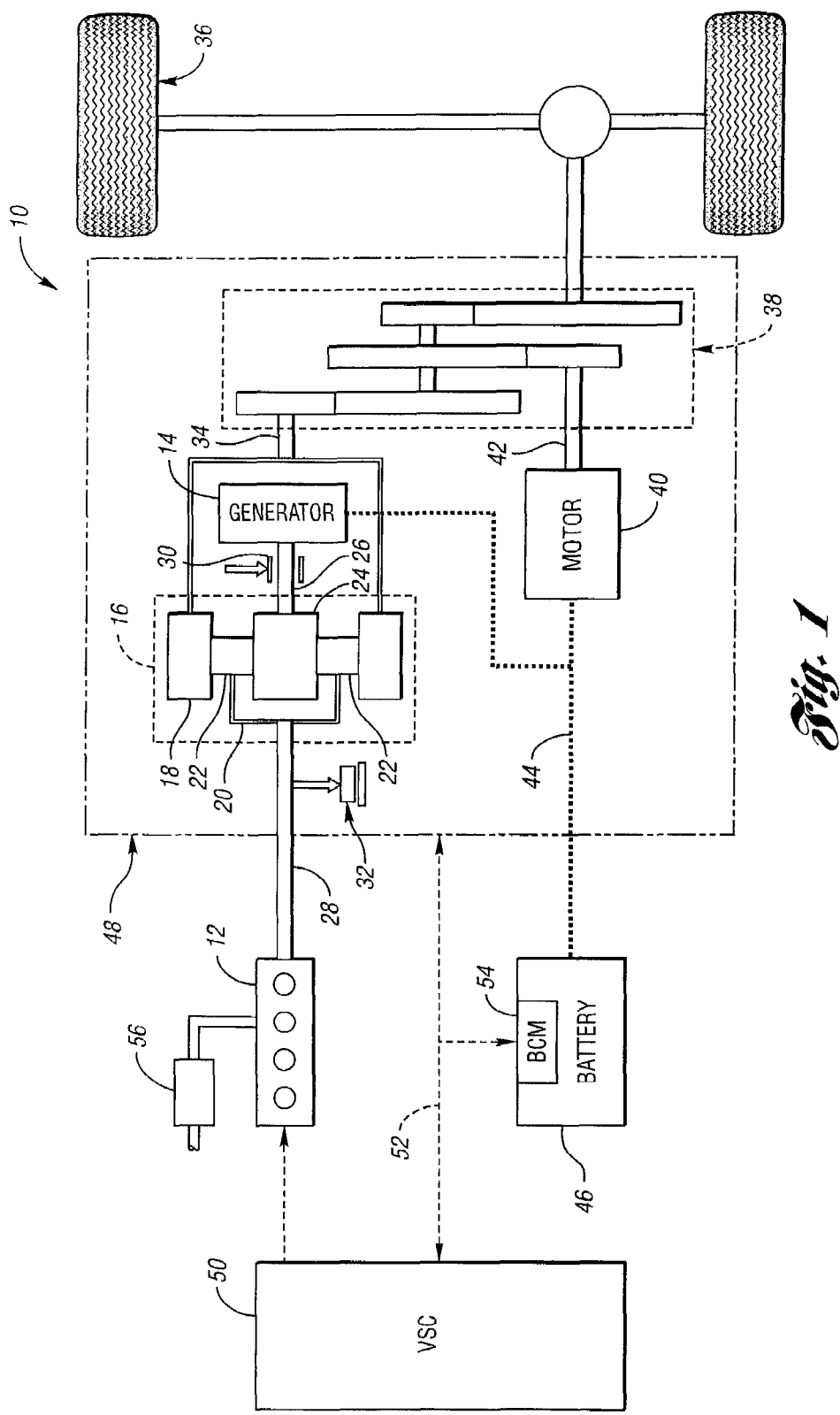
FIG. 1 is a schematic representation of a vehicle in accordance with the present invention.

FIG. 1 shows a schematic representation of a vehicle 10 in accordance with the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. A brake 30 is provided for stopping rotation of the shaft 26, thereby locking the sun gear 24 in place. Because this configuration allows torque to be transferred from the generator 14 to the engine 12, a one-way clutch 32 is provided so that the shaft 28 rotates in only one direction. Having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 through a second gear set 38. The vehicle 10 includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transaxle 48. To control the engine 12 and the components of the transaxle 48—i.e., the generator 14 and motor 40—a controller 50 is provided. As shown in FIG. 1, the controller 50 is a vehicle system controller (VSC), and although it is shown as a single controller, it may include multiple controllers. For example, the VSC 50 may include a separate powertrain control module (PCM), which could be software embedded within the VSC 50, or it could be a separate hardware device.

A controller area network (CAN) 52 allows the VSC 50 to communicate with the transaxle 48 and a battery control module (BCM) 54. Just as the battery 46 has the BCM 54, other devices controlled by the VSC 50 may have their own controllers. For example, an engine control unit (ECU) may communicate with the VSC 50 and may perform control functions on the engine 12. In addition, the transaxle 48 may include one or more controllers, such as a transaxle control module (TCM), configured to control specific components within the transaxle 48, such as the generator 14 and/or the motor 40.

The vehicle 10 also includes a catalytic converter, or catalyst 56, which receives exhaust gas from the engine 12, and facilitates reactions within the exhaust gas to reduce emissions introduced into the atmosphere. In order for the catalyst 56 to effectively create the reactions within the exhaust gas to reduce emissions, it is desired to have the catalyst 56 quickly reach its activation, or light-off temperature. Thus, the present invention contemplates setting at least one engine parameter to quickly increase the temperature of the catalyst 56. For example, the amount of air provided to the engine 12, the amount of fuel provided to the engine 12, the engine spark timing, or some combination thereof, can be set to effect a fast temperature rise in the catalyst 56. In particular, the spark timing of the engine 12 may be retarded to effect an increase in the rate of temperature increase of the catalyst 56—i.e., retarding the spark timing heats the catalyst 56 more quickly than it would otherwise be heated. Such an engine control may be preprogrammed into the VSC 50, which receives a number of inputs, including the temperature of the catalyst 56.

As discussed above, retarding the spark on an engine can reduce the engine output power. The present invention helps to compensate for this by augmenting the engine power with power from the motor 40 and/or generator 14, both of which receive energy from the battery 46. As discussed in detail below, the present invention includes controlling the engine 12 to quickly heat the catalyst 56, but also ensures that the vehicle 10 is provided with enough power to meet driver demands. How the engine 12 is controlled depends, at least in part, on the state of the battery 46.

Figure 2:
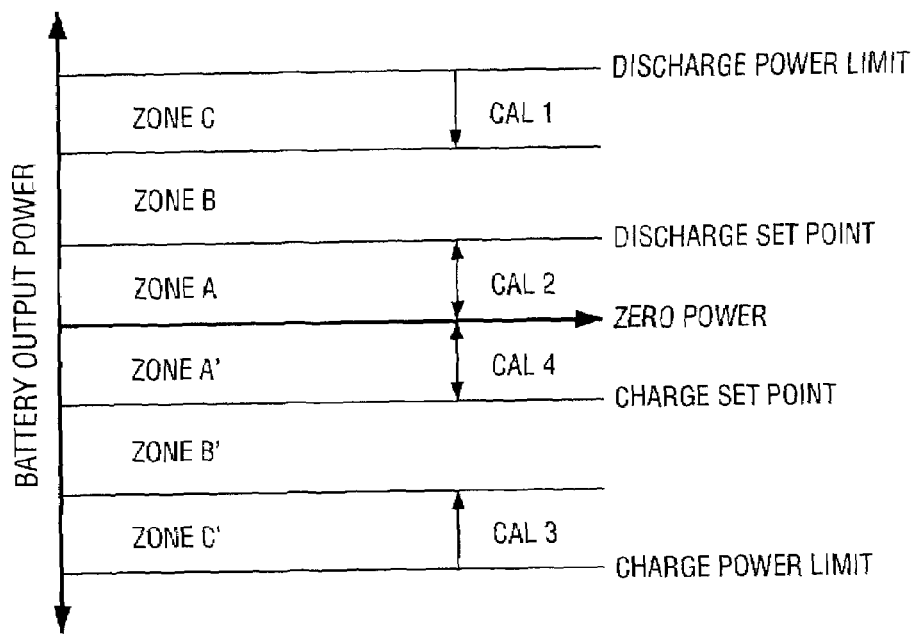
FIG. 2 is a graph illustrating different regions of battery output power.

FIG. 2 shows a graph representing the output power of the battery 46. Above the zero power line, the battery 46 is supplying powering to one or more vehicle devices, and is therefore discharging. Conversely, below the zero power line, the battery 46 is receiving power, and is therefore charging. Turning first to the discharge power side, a first predetermined range, Zone A, is bounded by the zero power line and a discharge set point line. The location of the discharge set point line is determined by a calibration number (CAL 2). The calibration number, CAL 2, is set close to the zero power line, but far enough away such that the battery 46 can provide the power to keep the vehicle 10 idling, or even moving slowly, and still be within Zone A.

As shown in FIG. 2, a third predetermined range, Zone C, is the farthest from the zero power line. Zone C is bounded by the discharge power limit, and a second line which is offset from the discharge power limit by the calibration number CAL 1. The discharge power limit is a function of the battery 46 itself—i.e., different batteries may have different discharge power limits—and the particular operating conditions of the battery 46. For example, the temperature of the battery 46 and the state of charge of the battery 46 will both affect the discharge power limit of the battery

46. In particular, as the temperature of the battery 46 decreases, the discharge power limit also decreases. Similarly, as the state of charge of the battery 46 decreases, the discharge power limit also decreases. Thus, the discharge power limit line, as shown in FIG. 2, may be farther away from, or closer to, the zero power line, depending on the operating state of the battery 46.

The discharge power limit, and other information about the battery 46, is communicated to the VSC 50 by the BCM 54. The calibration number CAL 1 is determined, at least in part, by the response time of the engine 12. That is, CAL 1 should be large enough so that if the battery is operating in Zone C, operation of the engine 12 can be adjusted to drive the battery back towards Zone A before the discharge power limit is reached. Therefore, if the engine 12 has a fast response time, the calibration number CAL 1 can be smaller than for an engine having a slower response time.

As shown in FIG. 2, a second predetermined range, Zone B, resides between Zone A and Zone C. As discussed in more detail below, the control of the engine 12 will be different if the battery 46 is operating in Zone B, rather than in Zone C. It is worth noting that because the discharge power limit is dependent on the operating conditions of the battery 46, the actual range of Zones A, B, and C may change as the vehicle 10 is operated. For example, Zone B will increase in size as the discharge power limit gets farther from the zero power line. This is because the calibration numbers CAL 1 and CAL 2 will remain constant such that the size of Zones A and C does not change. Conversely, if the discharge power limit gets closer to the zero power line, Zone B will decrease in size. In fact, if the discharge power limit gets small enough, Zone B may be completely collapsed. If the discharge power limit continues to approach the zero power line, the size of Zone A may also be decreased. Taken to its extreme, the discharge power limit can continue to approach zero until even Zone C is reduced or eliminated entirely.

On the other side of the zero power line—i.e., where the battery 46 is charging, Zones A', B' and C' are defined similarly to Zones A, B and C. Although the graph shown in FIG. 2 appears to be symmetrical about the zero power line, and indeed it may be, it may also be asymmetrical. Thus, two different calibration numbers, CAL 3 and CAL 4, are used in place of CAL 1 and CAL 2. In practice, CAL 4 may be set very large, such that Zone A' comes very close to the charge power limit. This means that the engine operating point is not adjusted until the battery output power is very close to the charge power limit. When both sides of the zero power line are being considered, the first predetermined range will include Zones A and A'. Similarly, the second predetermined range will include Zone B when the battery 46 is discharging, and Zone B' when the battery 46 is charging. So too, the third predetermined range will include Zone C when the battery 46 is discharging, and Zone C' when the battery 46 is charging.

Figure 3:
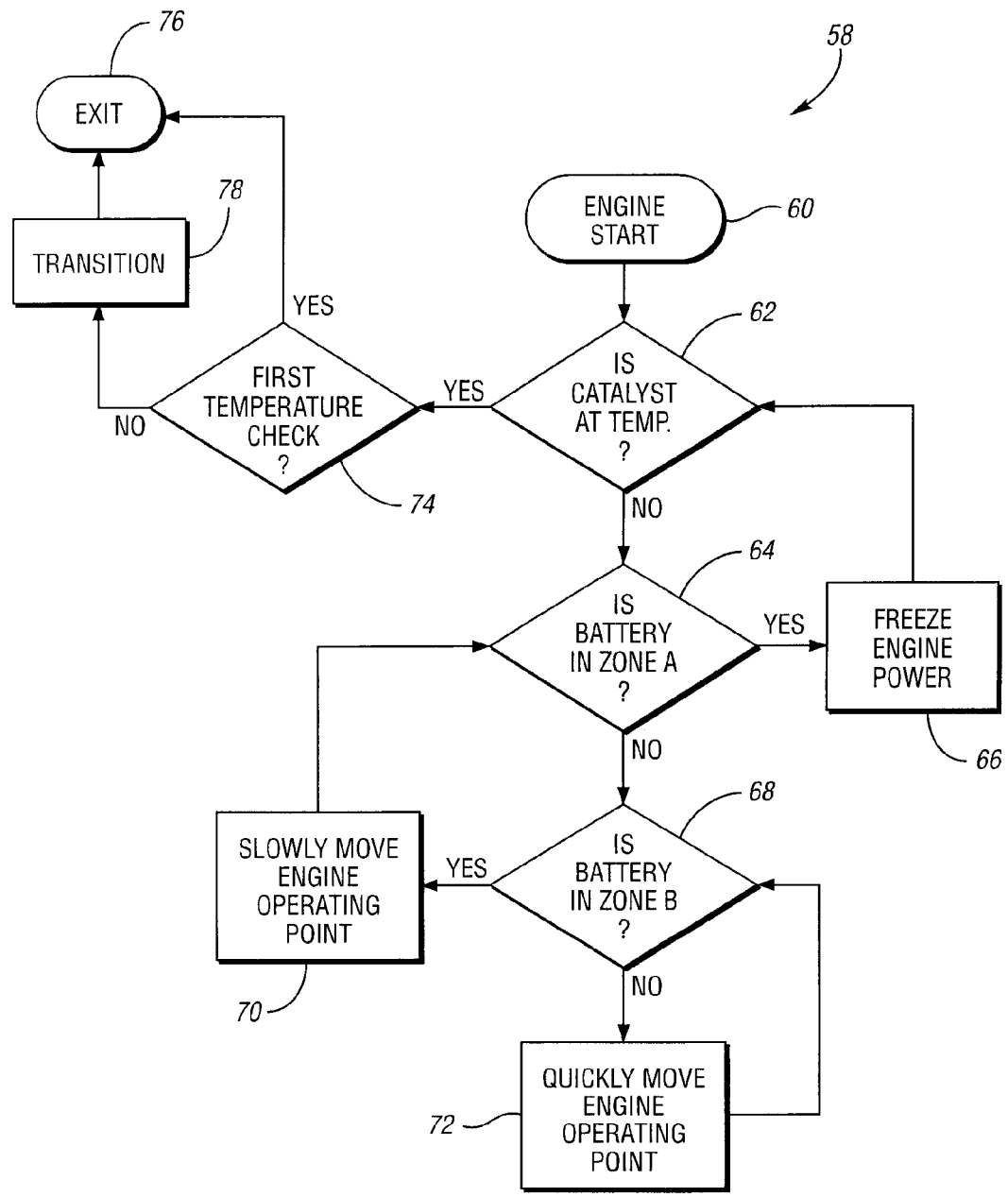
FIG. 3 is a flowchart illustrating a method in accordance with the present invention.

Using FIGS. 1 and 2 for reference, FIG. 3 shows a flowchart 58 illustrating a method of the present invention. At step 60, it is determined whether the engine 12 has been started. Because the vehicle 10 is an HEV, an engine start may occur upon ignition by the vehicle driver, or the engine 12 may be automatically started according to power demands on the vehicle 10. The desired power output for the vehicle 10 can be determined by the VSC 50, based on any of a number of different inputs. For example, driver demands such as accelerator pedal position, brake pedal position, and transmission gear selection, may be used by the VSC 50 to determine the desired output power for the vehicle 10.

As discussed above, at least one engine parameter is set to quickly heat the catalyst 56 after the engine 12 is started. At decision block 62 in FIG. 3, it is determined whether the catalyst 56 is at its light-off temperature. As explained below, monitoring the catalyst temperature is an ongoing process. For the sake of clarity, only one catalyst temperature check is shown in FIG. 3—i.e., at decision block 62—but it is understood that the catalyst temperature measurement is updated at some predetermined interval. Thus, multiple determinations are made as to whether the catalyst is at its light-off temperature.

If the catalyst 56 is not at its light-off temperature, it is next determined whether the battery 46 is operating within Zone A—see decision block 64. It is worth noting that the flowchart 58, shown in FIG. 3, addresses only the discharge side of the battery output power graph shown in FIG. 2. Indeed, as desired, the present invention may be used only when the battery 46 is discharging—i.e., when the battery output power is above the zero power line, or conversely, only when it is charging. The present invention can also be used to address both sides of the zero power line shown in FIG. 2—i.e., when the battery 46 is charging or discharging.

If, at decision block 64, it is determined that the battery 46 is operating in Zone A, the engine 12 is operated to keep the engine output power generally constant—see step 66. This allows the engine 12 to continue operation with its spark retarded, thereby quickly heating the catalyst 56. The term "generally constant", as used herein, contemplates that some variation in engine output power may be present as a result of the limitations on the engine controls. When the battery 46 is operating in Zone A, it is capable of providing the necessary power to the vehicle 10 to compensate for the reduction in engine power caused by the spark retard. After step 66, the method loops back into decision block 62 where the temperature of the catalyst 56 is again checked against the light-off temperature.

If at decision block 64, it is determined that the battery 46 is not operating in Zone A, it is then determined whether the battery 46 is operating in Zone B—see decision block 68. Again, Zone B can be replaced with Zones B' and B, if the method is to include battery charging and discharging. If, at decision block 68, it is determined that the battery 46 is operating in Zone B, the operating point of the engine 12 is slowly moved to drive the operating point of the battery 46 back into Zone A—see step 70.

When it is determined that the battery 46 is operating in Zone B, at least two things are known: the battery 46 is operating beyond the discharge set point, and it is farther than CAL 1 from the discharge power limit. Therefore, although it is desirable to have the battery 46 operating in Zone A, the battery is not operating close enough to the discharge power limit to warrant a severe change in engine operating conditions. This is why the engine operating point can be moved slowly at step 70. One example of moving the engine operating point, as shown in step 70, would be to reduce the spark retard on the engine 12, such that the engine 12 begins to output more power. This means that the catalyst 56 will be heated somewhat less quickly than desired, but that the battery 46 can output less power so that its operating point may be driven back to Zone A. The operating point of the engine 12 is moved slowly by using filters within the control software residing in the VSC 50. This provides a smoother transition so that the vehicle driver does not feel an abrupt change as the engine 12 starts to produce more power to drive the vehicle 10. Moreover, moving the engine operating point slowly allows for greater control and fewer transients. This is desirable, since transients may increase emissions. After step 70, the method loops back to decision block 64 to once again determine whether the battery 46 is operating within Zone A.

If, at decision block 68, it is determined that the battery 46 is not operating in Zone B, the engine operating point must be quickly moved to try to drive the battery operation back into Zone A—see step 72. Step 72 contemplates that the battery is operating in Zone C, or in an extreme case, beyond Zone C. Thus, it is important to move the engine operating point quickly, even though the driver may notice the transition of power being output from the battery 46 to the power being output from the engine 12. As discussed above, if the method is used to address both charging and discharging of the battery 46, step 72 will apply to Zone C and beyond, as well as Zone C' and beyond. If the battery is operating in Zone C' or beyond, the engine operating point may be changed by cutting off fuel to the engine 12, thereby eliminating any charging of the battery 46 by the engine 12.

If the battery 46 is operating in Zone C, it is necessary to quickly move the engine operating point, so that the battery 46 does not reach the discharge power limit. Even so, it may be desirable to provide some filter to the change in engine operating point. Such a filter will necessarily be a faster filter than the one used when the battery 46 is operating in Zone B. After the engine operating point is moved at step 72, the method loops back to decision block 68, where it is determined whether the battery 46 has been driven back into Zone B. Thus, the present invention operates the engine 12 to quickly heat the catalyst 56, unless the battery 46 requires an increase in output power from the engine 12. In such cases, the engine 12 provides the necessary power to drive the operation of the battery 46 back toward Zone A, where the engine 12 can again be operated to quickly heat the catalyst 56.

Returning to decision block 62 in FIG. 3, it is shown that once the catalyst 56 has reached its light-off temperature, another decision is made. Specifically, at decision block 74, it is determined whether the temperature check was the first temperature check for the catalyst 56. As noted above, the catalyst temperature is checked on an ongoing basis, and a different exit strategy is employed if the temperature check is the first check after the engine 12 is started. If the catalyst 56 is at or above its light-off temperature, and if it is the first time after engine start that the temperature has been checked, the method is ended—see block 76.

Figure 4:
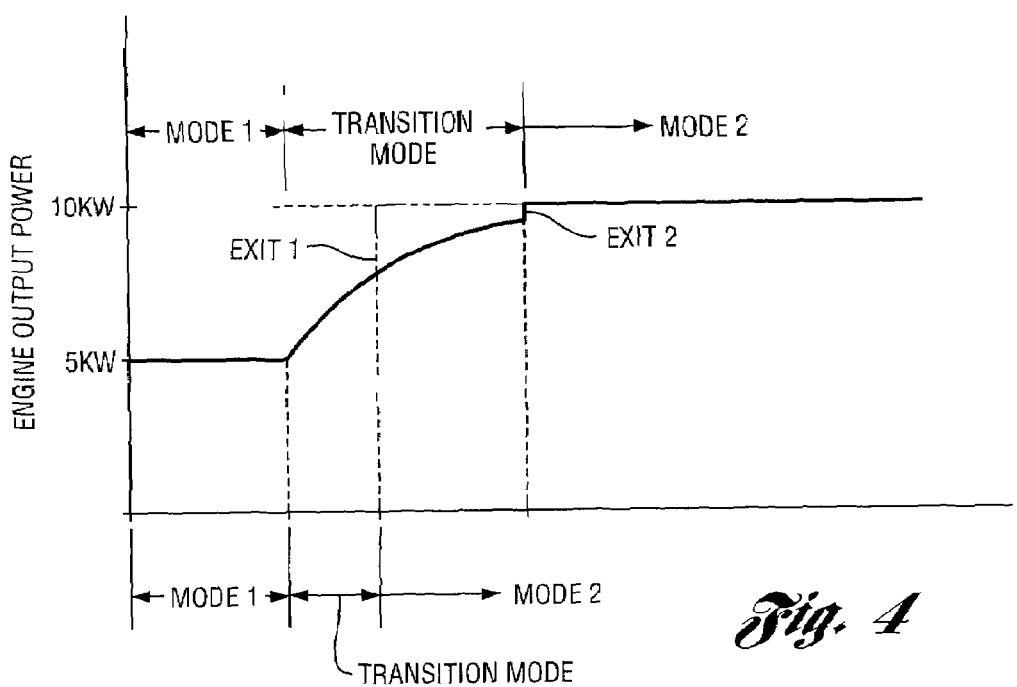
FIG. 4 is a graph illustrating various modes of operation of the vehicle shown in FIG. 1.

If the catalyst 56 reaches its light-off temperature on a temperature check subsequent to the first, a transition occurs at step 78, and then the method ends at step 76. The operation of the method shown in FIG. 3, and the transition and subsequent exit out of the method, are diagrammatically illustrated in FIG. 4. As shown in FIG. 4, the vehicle 10 is operated in a first mode, Mode 1, which corresponds generally to steps 60–72 in FIG. 3. Next, there is a Transition Mode, which corresponds to step 78 in FIG. 3, and finally, the vehicle 10 is operated in a second mode, Mode 2, after the transition is complete. Operation of the vehicle 10 in Mode 1 includes those steps described above to reduce exhaust emissions prior to the catalyst 56 reaching its light-off temperature. In general, this may be referred to as a cold start strategy for reduced emissions (CSSRE). Referring to FIG. 3, Mode 1 ends, and a transition begins, after the catalyst 56 has reached its light-off temperature. It is worth noting that the transition mode may also be initiated when the engine 12 has been operating for some predetermined amount of time, even if the catalyst 56 has not reached its light-off temperature. This helps to ensure that the vehicle 10 will not run the CSSRE indefinitely.

As discussed above, Mode 1 represents a cold start strategy that controls the vehicle 10, and in particular the engine 12, to quickly heat the catalyst 56. Conversely, the vehicle 10 is operated in Mode 2 based on other considerations. For example, in Mode 2, the engine 12 is operated, at least in part, based on the desired vehicle output power and the state of operation of the battery 46. For example, when the battery 46 needs to be charged, the engine 12 will provide output power to drive vehicle 10, and to charge the battery 46. Conversely, if the battery 46 has ample charge, it may provide some of the power used to drive vehicle 10, thereby facilitating a reduction in the power output from the engine 12. Because there may be a large change in power output from the engine 12 when Mode 1 ends and Mode 2 begins, a transition mode is provided to help make the change from Mode 1 to Mode 2 transparent to the driver.

As shown in FIG. 4, there are two different Transition Modes—one at the bottom of the graph, and one at the top. The two different Transition Modes merely illustrate two different ways by which the Transition Mode can be exited, such that Mode 2 begins. As discussed above, in conjunction with FIGS. 2 and 3, moving the engine operating point to drive the operation of the battery 46 back into Zone A employs the use of a filter to make the transition smooth. The Transition Mode between Mode 1 and Mode 2 also employs a filter to ensure that the output power of the engine 12 is not changed too abruptly.

FIG. 4 shows the engine output power during Mode 1 at a first level—5 kilowatts (KW). The 5 KW output power is used here for illustrative purposes only, and represents the situation where the engine output power remains generally constant—see step 66 in FIG. 3. To illustrate the transition to Mode 2, FIG. 4 assumes that the desired engine output power increases to a second level—10 KW in Mode 2. As shown in FIG. 4, the transition between the 5 KW level and the 10 KW level is carried out along a curve that gradually increases the engine power so that the increase is transparent to the vehicle driver. At the bottom of FIG. 4, the Transition Mode is relatively short. This is because the engine output power is increased until the point where the curve hits the line Exit 1. Exit 1 represents a sharp increase in power demanded by the vehicle driver. In such a case, the Transition Mode exits, and the output power of the engine 12 changes abruptly. This abrupt change is allowed to occur because the vehicle driver is expecting such a change. In contrast, if the vehicle driver does not demand a sharp increase in power, the Transition Mode continues, and the filtering of the change in engine output power also continues.

Without a sharp increase in driver demanded power, the Transition Mode will continue until the engine output power is within a predetermined amount from the desired power level of Mode 2, in this case 10 KW. The length of the line "Exit 2" represents this predetermined amount, and is set close enough to the Mode 2 power level that the driver will not notice the change out of the Transition Mode into Mode 2. Thus, the present invention provides a number of advantages, including a strategy for reducing emissions on cold start, and a smooth transition out of the cold start strategy into normal vehicle operation.

While the best mode for carrying out the invention has been described in detail, those familiar with the art to which this invention relates will recognize various alternative designs and embodiments for practicing the invention as defined by the following claims.

What is claimed is:

1. A method for operating a vehicle to reduce exhaust emissions, the vehicle including an engine, an electric machine, an energy storage device capable of providing energy to operate the electric machine, and a catalyst for facilitating a reaction in exhaust gas from the engine, the method comprising:
setting at least one engine parameter to effect an increase in a rate of temperature increase of the catalyst when the engine is operating, thereby decreasing the time required for the catalyst to reach a temperature whereat emissions are reduced;
operating the engine such that engine output power is generally constant when an output power of the energy storage device is within a first predetermined range; and
adjusting the at least one engine parameter, thereby changing the engine output power, when the output power of the energy storage device is outside the first predetermined range, the at least one engine parameter being adjusted to facilitate a change in the output power of the energy storage device from outside the first predetermined range into the first predetermined range.

2. The method of claim 1, wherein the at least one engine parameter includes at least one of an amount of air provided to the engine, an amount of fuel provided to the engine, and an engine spark timing.

3. The method of claim 1, further comprising using a first filter to slow the change of the engine output power when the output power of the energy storage device is within a second predetermined range.

4. The method of claim 3, further comprising using a second filter to slow the change of the engine output power when the output power of the energy storage device is within a third predetermined range, the second filter facilitating a faster change of the engine output power than the first filter.

5. The method of claim 4, wherein the third predetermined range is defined by an output power limit of the energy storage device and a first predetermined power value, the first predetermined power value being at least partly based on a response time of the engine to changes to the at least one engine parameter.

6. The method of claim 5, wherein the first predetermined range is at least partly defined by at least one set point power level of the energy storage device.

7. The method of claim 1, further comprising adjusting the at least one engine parameter to effect a reduction in the rate of temperature increase of the catalyst when the engine is operating when the catalyst temperature is at least a predetermined temperature or the engine has been operating for a predetermined amount of time.

8. The method of claim 7, wherein adjusting the at least one engine parameter to effect a reduction in the rate of temperature increase of the catalyst when the engine is operating includes using a third filter to slow the change of the engine output power.

9. The method of claim 8, wherein the third filter is removed when an operator of the vehicle demands an increase in vehicle power greater than a predetermined power increase.

10. The method of claim 1, further comprising:
operating the electric machine to provide power to propel the vehicle, thereby augmenting the engine output power, when the at least one engine parameter is set to effect an increase in the rate of temperature increase of the catalyst.

11. A method for operating a vehicle to reduce exhaust emissions, the vehicle including an engine, an electric machine, an energy storage device capable of providing energy to operate the electric machine, and a catalyst for facilitating a reaction in exhaust gas from the engine, the method comprising:
determining a desired output power for the vehicle;
operating the vehicle in a first mode when at least one predetermined condition is met, the first mode including providing at least some of the desired vehicle output power with the electric machine when the desired vehicle output power is non-zero, setting at least one engine parameter to effect an increase in a rate of temperature increase of the catalyst when the engine is operating, operating the engine such that engine output power is generally constant when an output power of the energy storage device is within a first predetermined range, and adjusting the at least one engine parameter, thereby changing the engine output power, when the output power of the energy storage device is outside the first predetermined range, the at least one engine parameter being adjusted to facilitate a change in the output power of the energy storage device from outside the first predetermined range into the first predetermined range; and
operating the vehicle in a second mode when the at least one predetermined condition is not met, the second mode including operating the engine based on the desired vehicle output power and a state of the energy storage device.

12. The method of claim 11, wherein the at least one predetermined condition includes at least one of the catalyst temperature being at least a predetermined temperature and the engine operating for a predetermined time.

13. The method of claim 11, wherein setting at least one engine parameter includes retarding a spark timing of the engine.

14. The method of claim 11, further comprising operating the vehicle in a transition mode between the first mode and the second mode, the transition mode including changing the engine output power from a first level to a second level and filtering the change in engine output power during at least a portion of the change from the first level to the second level, thereby slowing the change in engine output power from the first level to the second level.

15. The method of claim 14, further comprising exiting the transition mode when at least one exit condition is met, the at least one exit condition including at least one of the engine power being less than a predetermined amount from the second level and a driver power demand being greater than a predetermined power demand.

16. The method of claim 11, wherein the first mode further includes using a first filter to slow the change of the engine output power when the output power of the energy storage device is within a second predetermined range.

17. The method of claim 11, wherein the first mode further includes using a second filter to slow the change of the engine output power when the output power of the energy storage device is within a third predetermined range, the second filter facilitating a faster change of the engine output power than the first filter.

18. The method of claim 17, wherein the third predetermined range is defined by an output power limit of the energy storage device and a first predetermined value.

19. A vehicle, comprising:
an engine;
an electric machine operable to drive the vehicle;

an energy storage device capable of providing energy to operate the electric machine;

a catalyst capable of facilitating a reaction in exhaust gas from the engine; and at least one controller configured to set at least one engine parameter to effect an increase in a rate of temperature increase of the catalyst when the engine is operating, thereby decreasing the time required for the catalyst to reach a temperature whereat emissions are reduced, the at least one controller being further configured to control the engine to provide a generally constant output power when an output power of the energy storage device is within a first predetermined range, and to adjust the at least one engine parameter, thereby changing the engine output power, when the output power of the energy storage device is outside the first predetermined range, the at least one engine parameter being adjusted to facilitate a change in the output power of the energy storage device from outside the first predetermined range into the first predetermined range.

20. The vehicle of claim 19, wherein the at least one engine parameter includes at least one of an amount of air provided to the engine, an amount of fuel provided to the engine, and an engine spark timing.

21. The vehicle of claim 19, wherein the at least one controller is further configured to adjust the at least one engine parameter to effect a reduction in the rate of temperature increase of the catalyst when the engine is operating when the catalyst temperature is at least a predetermined temperature or the engine has been operating for a predetermined amount of time.

* * * * *